July 13, 1965 P. W. CHANEY 3,194,011
AIRCRAFT WITH NON-COMBUSTION AIR REACTION ENGINE
Filed April 23, 1962 8 Sheets-Sheet 1

INVENTOR.
PAUL W CHANEY
BY
ATTORNEYS

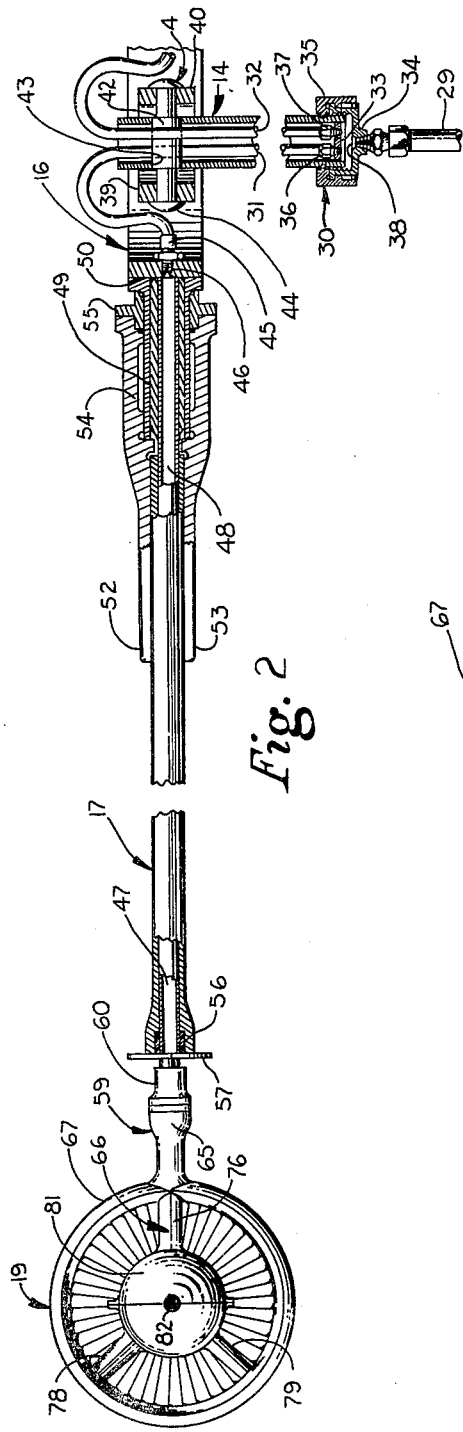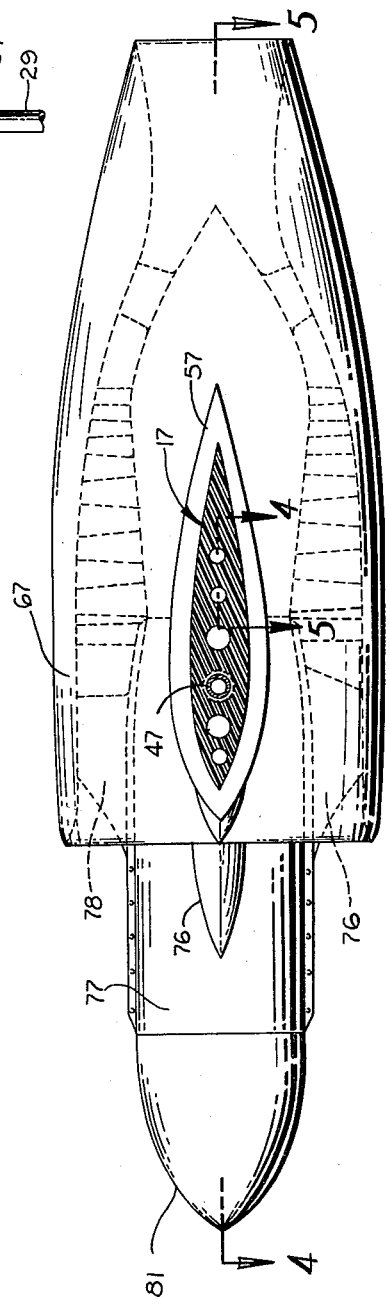

July 13, 1965 P. W. CHANEY 3,194,011
AIRCRAFT WITH NON-COMBUSTION AIR REACTION ENGINE
Filed April 23, 1962 8 Sheets-Sheet 3

INVENTOR.
PAUL W CHANEY
BY
Donnelly, Mentag & Harrington
ATTORNEYS

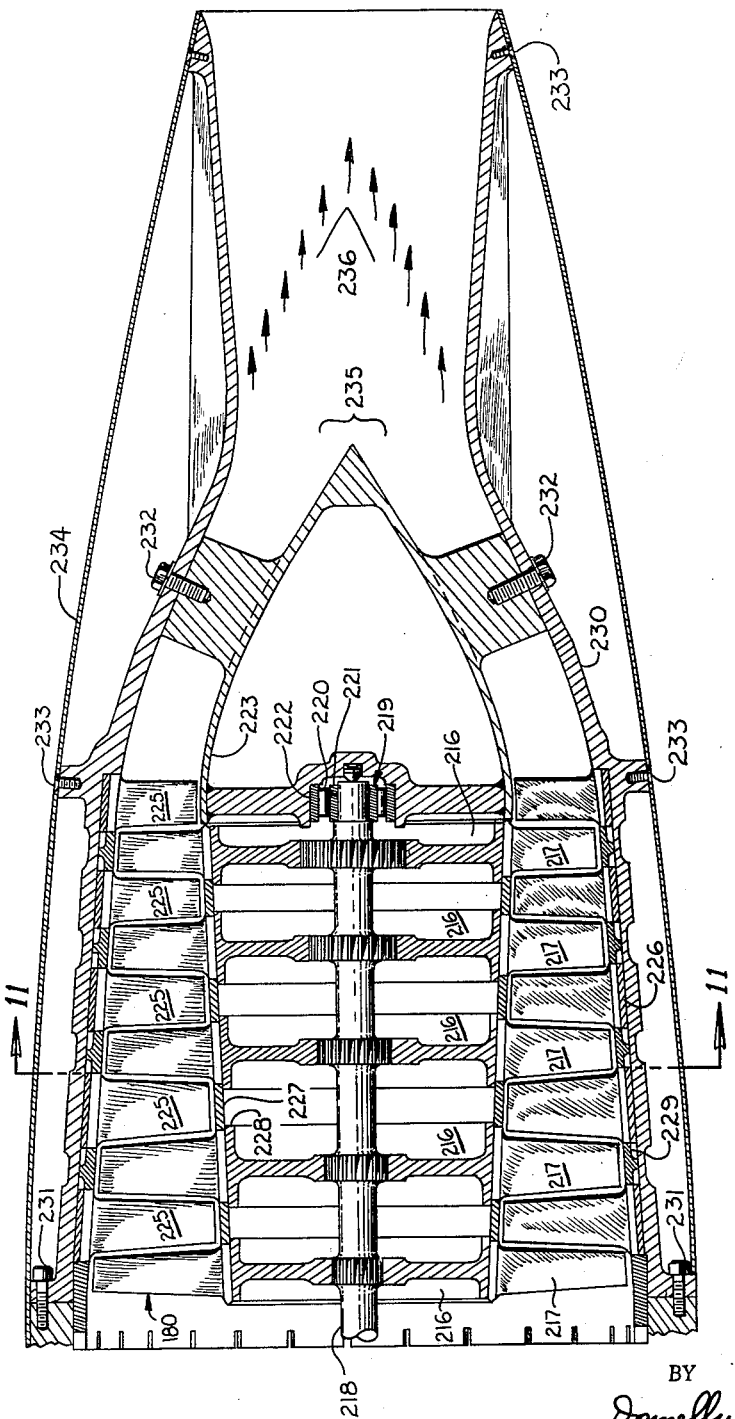

July 13, 1965 P. W. CHANEY 3,194,011
AIRCRAFT WITH NON-COMBUSTION AIR REACTION ENGINE
Filed April 23, 1962 8 Sheets-Sheet 5
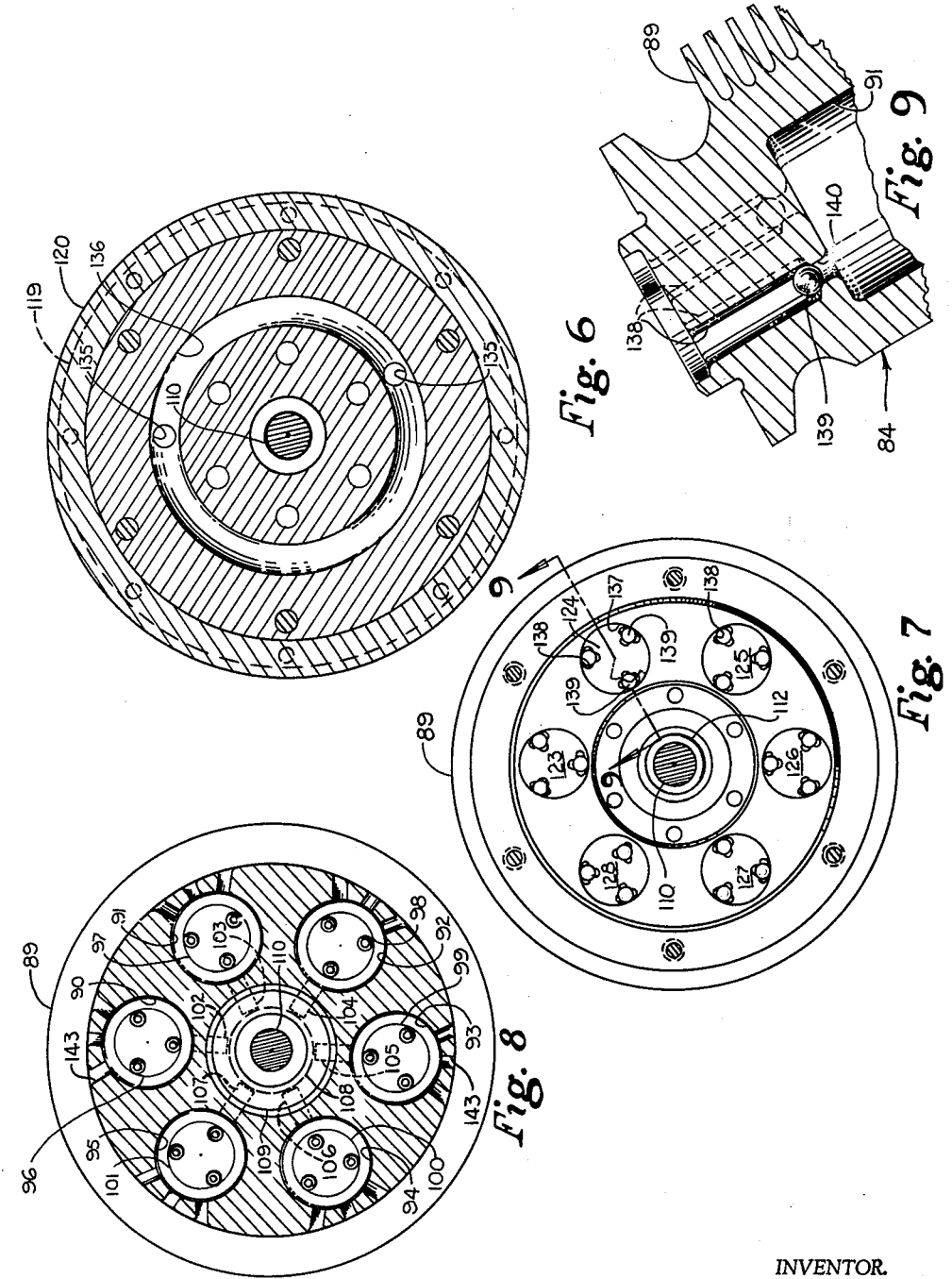
INVENTOR.
PAUL W CHANEY
BY
Donnelly, Mentag & Harrington
ATTORNEYS July 13, 1965  P. W. CHANEY  3,194,011
AIRCRAFT WITH NON-COMBUSTION AIR REACTION ENGINE
Filed April 23, 1962  8 Sheets-Sheet 6

INVENTOR.
Paul W Chaney
BY
Donnelly, Mentag & Harrington
ATTORNEYS

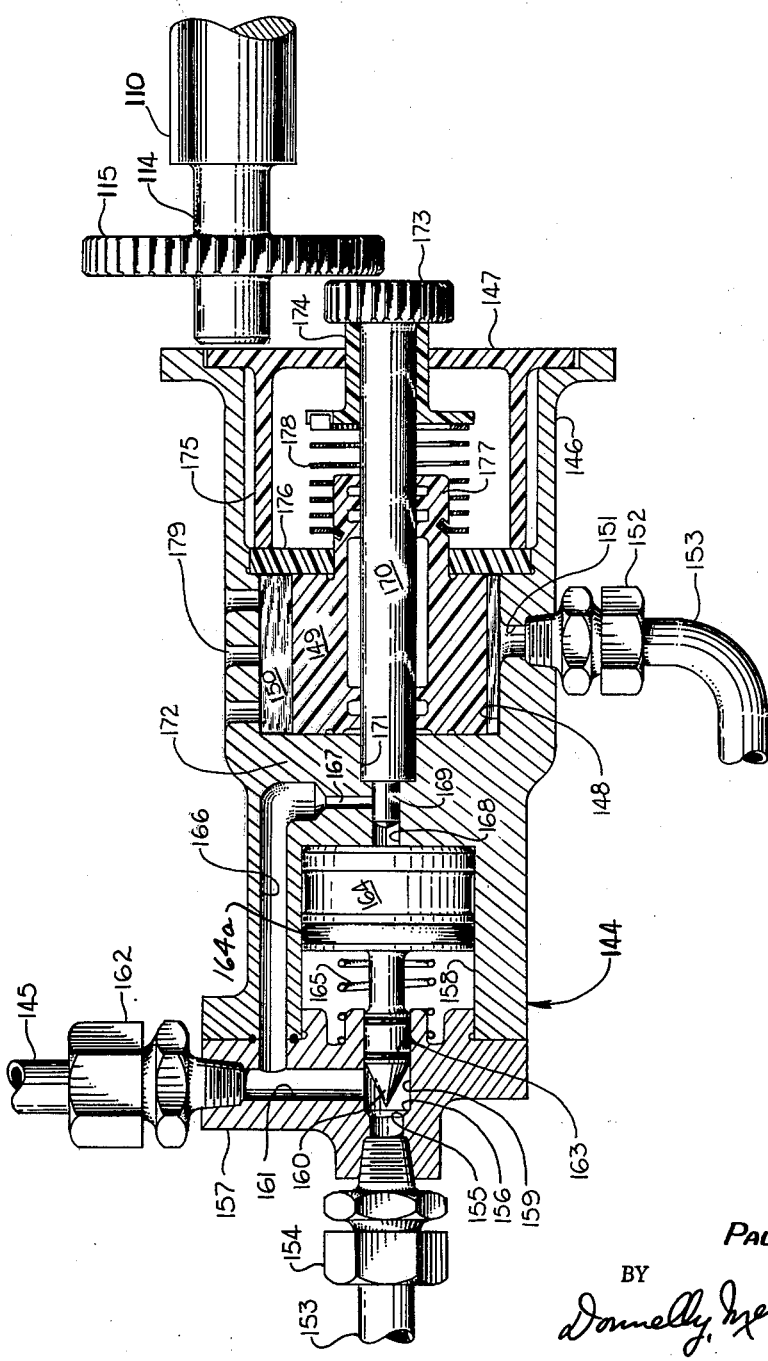

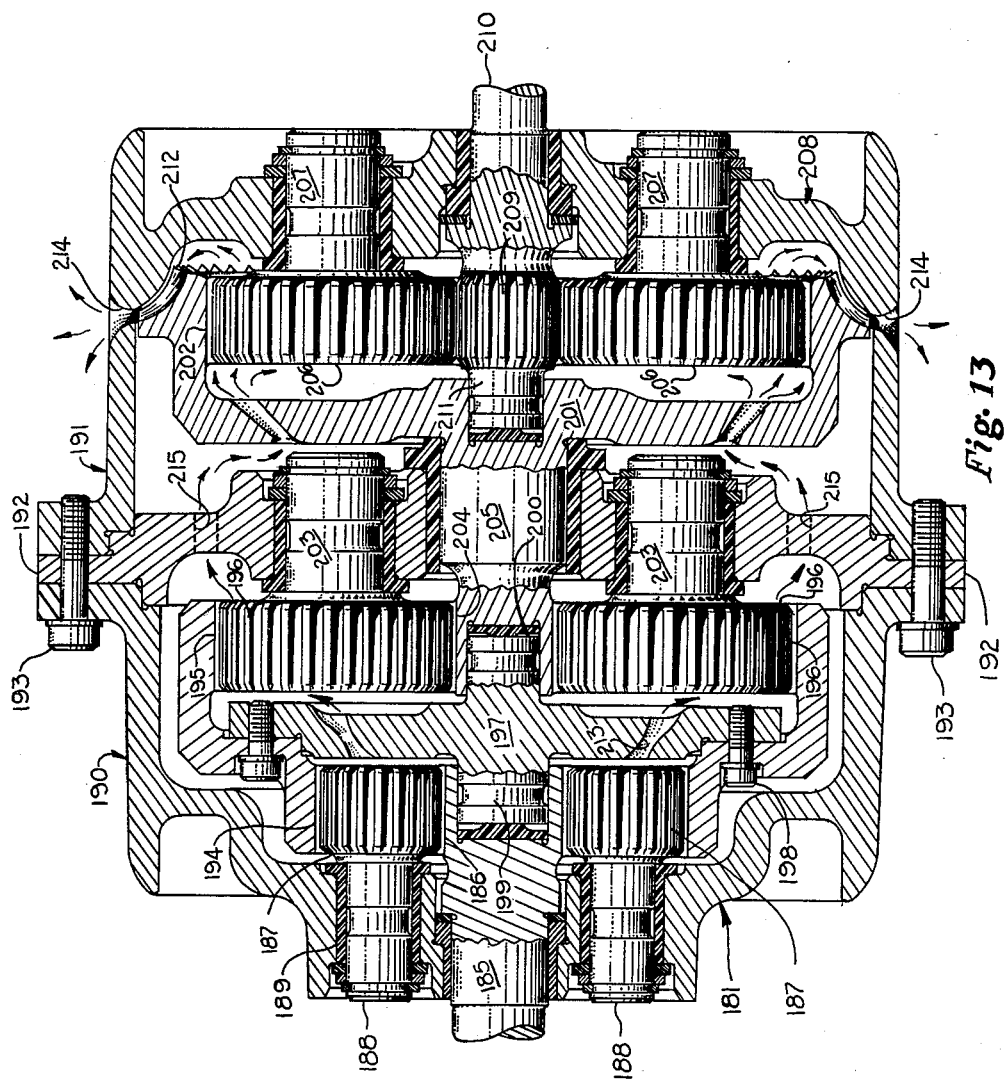

United States Patent Office 3,194,011
Patented July 13, 1965

3,194,011
AIRCRAFT WITH NON-COMBUSTION AIR REACTION ENGINE
Paul W. Chaney, 325 Balchewana, Clawson, Mich.
Filed Apr. 23, 1962, Ser. No. 189,443
9 Claims. (Cl. 60—35.5)

This invention relates generally to a novel and improved reaction motor for use as propulsion means for aircraft, and more particularly, for use mainly on helicopters.

This invention relates to aircraft which are powered by means of stored compressed air. It is well known that hot gas jet engines are used in helicopters because they have ideal characteristics when considering their power output versus weight problems encountered in helicopter design. Hot gas jet engines, however, are not efficient in relation to the fuel consumption per pound horsepower versus time. Internal combustion engines also have many disadvantages when used as propulsion means in helicopters. Internal combustion engines are heavy and do not have desirable characteristics when used in helicopters in the relation of their power output versus the gallons of fuel used per hour. Furthermore, when an internal combustion engine is used in a helicopter, a heavy gear reduction type transmission is required as well as a means to compensate for the torque reaction caused by the application of the power to the rotor system of the helicopter. Internal combustion engines also require ample room for a reasonable size fuel tank. In a helicopter, the most efficient point of power application is on the rotor blades themselves, and particularly, at the tip of the rotor blades. Accordingly, it is an important object of the present invention to provide an improved and more dependable propulsion means for aircraft, and more particularly, for helicopters and which is simple in construction, economical of manufacture, and highly efficient in operation.

It is another object of the present invention, to provide a novel and improved propulsion means for aircraft and which will permit a more simple helicopter design with optimum safety features, such as providing a single control stick for controlling the propulsion means in addition to a rotor system control.

It is a further object of the present invention to provide a novel and improved propulsion means for aircraft which comprises a linear action type piston engine which is powered by means of stored compressed air, and which piston engine drives an axial-flow high speed air compressor in which the desired thrust reaction is generated for propulsion purposes. The air is supplied to the compressed air storage tank by means of a conventional internal combustion engine driving a conventional piston type air-compressor.

It is still another object of the present invention to provide a novel and more efficient propulsion means for aircraft which is more efficient than the prior art aircraft propulsion means in its fuel efficiency characteristic relative to time.

It is still another object of the present invention to provide a novel and improved air reaction engine which incorporates a novel and compact automatic air starter.

It is still another object of the present invention to provide a novel and improved aircraft propulsion means which incorporates an air reaction engine, a novel transmission means and a novel axial flow air-compressor.

Other object, features and advantages of this invention will be apparent from the following detailed description and appended claims, reference being had to the accompanying drawings forming a part of the specification wherein like reference numerals designate corresponding parts of the several views.

In the drawings:

FIG. 2 is an enlarged, broken, elevation view, partly in section, of the structure illustrated in FIG. 1, taken along the line 2—2 thereof and looking in the direction of the arrows;

FIG. 3 is an enlarged, elevational, transverse, sectional view of the rotor blade structure illustrated in FIG. 1, taken along the line 3—3 thereof, looking in the direction of the arrows, and showing the relative position of the reaction engine of the present invention in relation to the rotor blade;

FIG. 5 is an enlaged, horizontal, sectional view of the structure illustrated in FIG. 3, taken along the line 5—5 thereof, and looking in the direction of the arrows;

FIG. 6 is an elevational, sectional view, slightly enlarged, of the structure illustrated in FIG. 4, taken along the line 6—6 thereof, and looking in the direction of the arrows;

FIG. 7 is a slightly enlarged, elevational, sectional view of the structure illustrated in FIG. 4, taken along the line 7—7 thereof with the engine housing removed and looking in the direction of the arrows;

FIG. 8 is a slightly enlarged, elevational, sectional view of the structure illustrated in FIG. 4, taken along the line 8—8 thereof, with the engine housing removed and looking in the direction of the arrows;

FIG. 9 is a fragmentary, enlarged, sectional view of the structure illustrated in FIG. 7, taken along the line 9—9 thereof and looking in the direction of the arrows;

FIG. 12 is an enlarged, longitudinal, sectional view of the air starter included in the structure of FIG. 4, taken along the line 12—12 thereof, and looking in the direction of the arrows; and, FIG. 13 is an enlarged, longitudinal, sectional view of the transmission incorporated in the structure illustrated in FIG. 4, taken along the line 13—13 thereof, and looking in the direction of the arrows.

Figure 1:
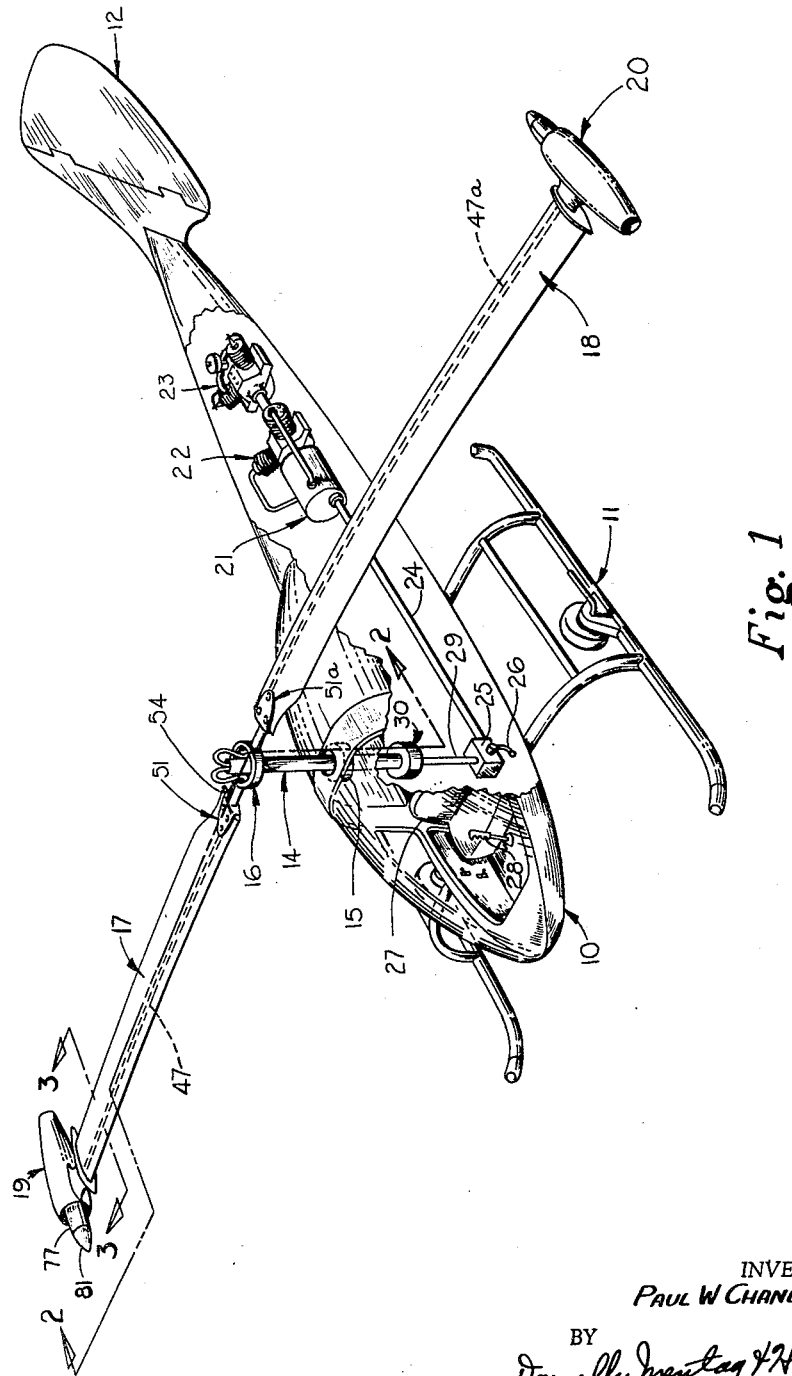
FIG. 1 is a perspective view, with parts broken away, of a helicopter provided with a clean-air, reaction engine propulsion means made in accordance with the principles of the present invention.

Referring now to the drawings, and in particular to FIG. 1 wherein my invention is illustrated as being incorporated in a typical helicopter, the numeral 10 generally indicates the fuselage of the helicopter which is provided with a suitable combination landing gear generally indicated by the numeral 11, and a suitable angularly mounted rudder generally indicated by the numeral 12. The helicopter is provided with a rotor shaft 14 which is pivotally disposed and rotatably journalled and supported by any suitable bearing means as by the bearing support means 15. Operatively mounted on the upper outer end of the rotor shaft 14, as described in detail hereinafter, is a rotor hub 16 which is operatively connected to the rotor blades 17 and 18. Fixedly mounted on the outer ends of the rotor blades 17 and 18 are the air reaction engines 19 and 20, respectively.

The clean-air reaction engines 19 and 20 are adapted to run at constant speeds and the speed of the helicopter may be controlled by a standard or conventional rotor blade pitch control system which has been omitted from the drawings so as not to confuse the structure of the present invention with other usual standard structures. As shown in FIGS. 1, 2 and 3, the stored compressed air for operation of the engines 19 and 20 is contained in the fuselage 10. The numeral 21 generally designates a suitable standard lightweight air tank which may be secured in the fuselage 10 by any suitable means. The numeral 22 generally designates a suitable standard piston type air compressor for supplying compressed air to the tank 21 and the air compressor 22 may be powered by any suitable standard engine, as for example, the engine generally indicated by the numeral 23. The engine may be of the air cooled, internal combustion engine type. The internal combustion engine 23 may be a low horsepower engine, as for example, a 20 horsepower engine because of the limited compressed air requirements of the linear action type piston engines 19 and 20 which provide the power to operate the axial flow compressors incorporated in the over-all engine structures 19 and 20.

The compressed air stored in the storage tank 21 is metered out through an air line, or suitable conduit 24, which is connected at the one end thereof to a suitable control valve indicated by the numeral 25. The control valve 25 is provided with an operating lever 26 which may be controlled by a pilot sitting in the adjacent seat 27. The numeral 28 indicates the helicopter control stick which would be of the standard type. As shown in FIGS. 1 and 2, a second air line or conduit 29 is fixedly mounted on the upper side of the control valve 25 and extends upwardly and is operatively connected to a rotary air seal 30. The rotary air seal 30 may be of any suitable type. As shown in FIG. 2, the lower end of the rotor shaft 14 is suitably rotatably mounted in the upper end of the rotary seal 30. The rotary seal 30 includes suitable sealing means which engages the outer surface of the lower end of the rotary shaft 14 to prevent leakage of air thereby.

As shown in FIG. 2, the rotor shaft 14 is tubular and has operatively mounted therein a pair of flexible conduits or air lines generally indicated by the numerals 31 and 32. The lower end of the rotor shaft 14 is enclosed by the transverse plate 33. The enclosed lower end of the rotor shaft 14 cooperates with the inner cup-shaped portion 34 of the rotary seal 30 to form a chamber into which the conduit 29 delivers compressed air. The outer casing portion 35 of the rotary seal 30 is threadably mounted on the inner casing part 34 and functions to retain the lower end of the rotor shaft 14 in sealing rotary engagement in the rotary seal 30.

As shown in FIG. 2, the flexible tubes 31 and 32 have the lower ends thereof fixedly secured to the rotor shaft plate 33 by means of the fittings 36 and 37 which extend through the rotor shaft plate 33 so as to communicate the lower ends of the flexible tubings 31 and 32 with the chamber 38 inside of the rotary seal 30. It will be seen that the compressed air will pass from the conduit 29 into the chamber 38 and thence into the lower ends of the flexible tubes 31 and 32.

The circular rotor hub 16 is disposed about the upper end of the rotor shaft 14 and is secured to the rotor shaft 14 by any suitable conventional semi-rigid connection means. As for example, by means of a pair of transverse plates 39 and 40, and the interconnecting shaft 41. The cross plates 39 and 40 are spaced on opposite sides of the upper end of the rotor shaft 14. The connector shaft 41 has an enlarged central portion 42 which is fixedly secured in a transverse aperture 43 formed in the upper end of the rotor shaft 14. The outer ends of the shaft 41 are peened over as indicated by the numeral 44. It will be seen in FIG. 2 that the upper ends of the flexible tubes 31 and 32 extend past the shaft portion 42 on opposite sides thereof. The flexible tubes 31 and 32 pass out of the upper end of the rotor shaft 14 and are folded over and suitably connected by means of the fitting 45 to a passage 46 formed in the rotor hub 16. It will be understood that the rotor blade 18 and the engine structure 20 are constructed the same as the rotor blade 17 and the engine structure 19, respectively, and accordingly, the details of only one rotor blade and reaction engine have been shown in the following described figures.

As shown in FIGS. 1 and 2, the reaction engine 19, which also may be termed an air motor, is mounted on a supporting tube 47 which is fixedly connected to the rotor hub 16 so as to keep the supporting tube 47 in alignment with the axis of rotation of the rotor blade 17 and yet to permit the rotor blade 17 to pivot about the tube 47 for collective pitch control of the rotor blade. As shown in FIG. 2, the inner end of the supporting tube 47 receives therewithin the outer end of an air conduit 48 which is carried in the supporting tubular shaft 49. The shaft 49 is provided with the enlarged flange 50 on the inner end thereof and this flange is suitably connected to the rotor hub 16 by any suitable means. It will be seen that compressed air may pass through the fitting 45, the passage 46, the conduit 48 and into the supporting tube 47. The rotor blade 17 is suitably rotatably supported on the supporting tubular shaft 49 by means of the mounting bracket 51 which has a C-shaped outer portion into which the inner end of the rotor blade 17 is received. As shown in FIG. 2, the mounting bracket 51 includes the upper leg portion 52 and the lower leg portion 53 which is spaced apart from the leg portion 52 to form the legs of the C-shaped supporting part of the bracket and within which the inner end of the rotor blade 17 is received. The rotor blade 17 is connected to the bracket arms 52 and 53 by any suitable means as by bolts. The inner end of the supporting bracket 51 is provided with a tubular supporting shaft 54 which is adapted to be rotatably mounted on and supported by a supporting tubular shaft 49. The supporting bracket portion 54 is retained on the supporting tubular shaft 49 by any suitable means as by the retainer member 55 which permits rotatable motion, but prevents longitudinal motion of the bracket portion 54 relative to the supporting shaft 49.

It will be understood that the rotor blade 18 is connected to the rotor shaft hub 16 by any suitable supporting bracket generally indicated by the numeral 51a. The compressed air is also conveyed from the flexible tubing 32 to the engine 20 by means of a supporting tube 47a which is constructed in the same manner as the tube 47.

It will be understood that the supporting bracket portion 54 may be termed a heavy duty bearing attachment member. The supporting shaft 49 may also be termed a rotor hub root attachment. The usual flapping hinge and drag hinge may be incorporated in the rotor hub root attachment 49. The rotor blade 17 is provided at the outer end thereof with a "Teflon" sleeve bearing 56 which is adapted to rotatably support the tip or outer end of the rotor blade 17 to eliminate any possible binding of the rotor blade 17 while the rotor blade is pivoting during operation of the same, and at which time the usual bending moments occur.

Figure 4:
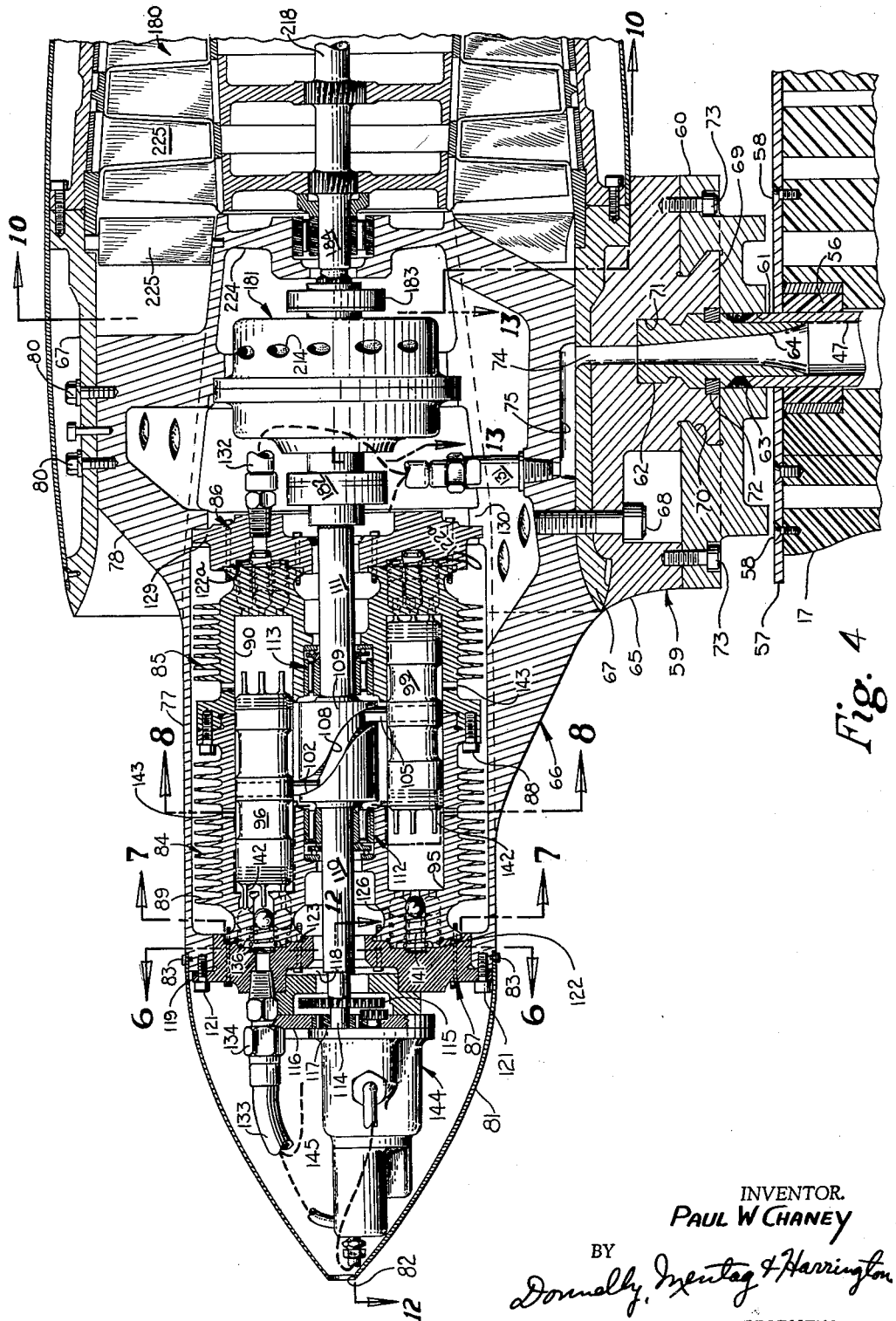
FIG. 4 is an enlarged, horizontal, sectional view of the structure illustrated in FIG. 3, taken along the line 4—4 thereof, and looking in the direction of the arrows.
Figure 11:
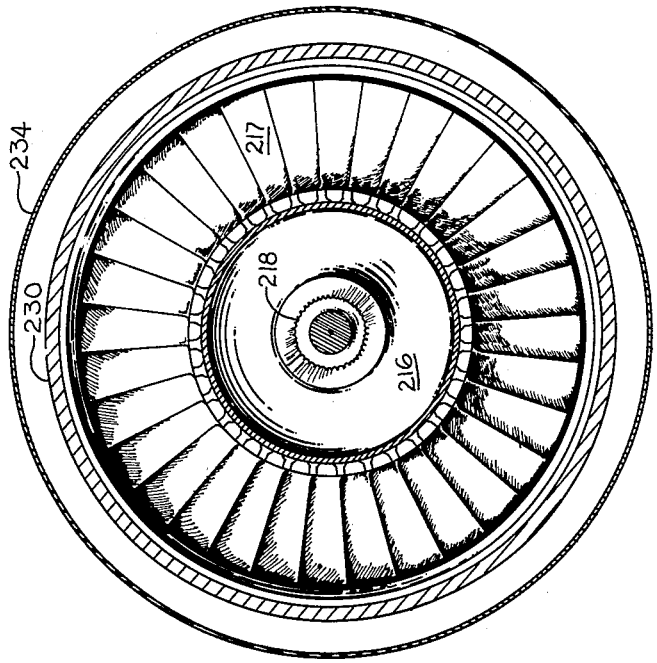
FIG. 11 is an elevational, sectional view of the structure illustrated in FIG. 5, taken along the line 11—11 thereof, looking in the direction of the arrows and showing the third stage compressor rotor blade assembly.
Figure 10:
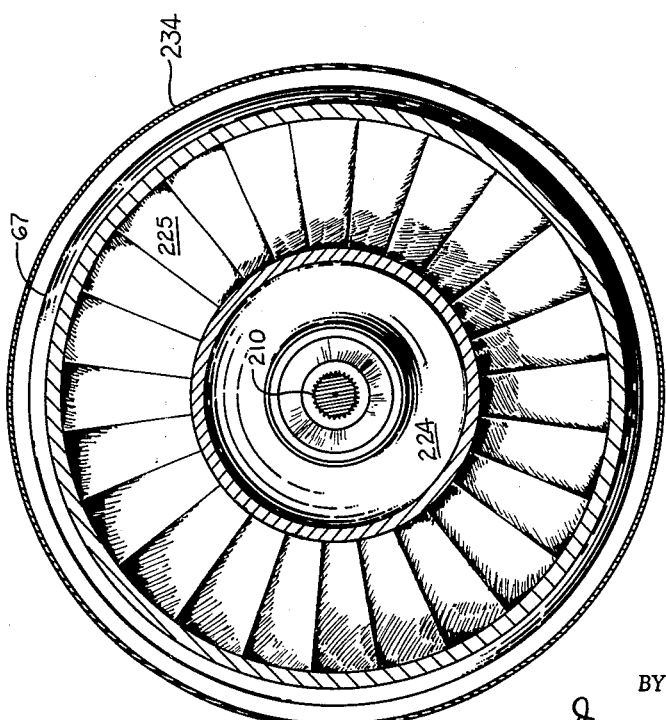
FIG. 10 is a slightly enlarged, elevational, sectional view of the structure illustrated in FIG. 4, taken along the line 10—10 thereof, looking in the direction of the arrows and showing the first stage compressor stator blade assembly.

As shown in FIG. 4, the outer end of the rotor blade 17 is enclosed by the vertical end plate 57 which is secured to the rotor blade 17 by any suitable means as by a plurality of the screws 58. As shown in FIGS. 2 and 4, a main support dovetail fastener assembly generally indicated by the numeral 59 is fixedly mounted on the outer end of the support tube 47 by means of the following described structure. An inner portion of the dovetail assembly is indicated by the numeral 60 and this inner portion is provided with a central hole 61 therethrough in which the outer end of the support tube 47 is mounted. The support tube 47 is provided with an outwardly directed extension 62 which is made from a solid shaft and which has a reduced inner end which is received into the outer end of the support tube 47. As shown in FIG. 4, the support tube 47 is welded to the dovetail assembly portion 60 and the extension member 62 by means of welding, as indicated by the numeral 63. The support tube extension 62 is provided with a metering air channel 64 therethrough which communicates with the interior of the support tube 47.

The outer portion 65 of the dovetail fastener assembly is secured to the engine housing and main support assembly 66 and the front end of the entrance air guide duct by means of a plurality of bolts 68 or any other suitable fastening means. The outer dovetail fastener portion 65 is provided with the inwardly extended dovetail 69 which is adapted to be vertically, slidably mounted into the mating dovetail slot 70 formed in the inner dovetail fastener portion 60. The inner and outer dovetail fastener portions 60 and 65 are further interconnected by the T-shaped outer end of the support tube 62 which is adapted to be slidably mounted into a mating T-shaped slot 71 formed in the outer portion 65. The numeral 72 in FIG. 4 indicates a suitable sealing stop ring. The tube portions of the dovetail fastener assembly 65 are further interconnected by a plurality of lock bolts indicated by the numeral 73. As shown in FIG. 4, the metering air channel 64 and the support tube extension 62 communicates with an air passage 74 which in turn communicates with a directional flow channel 75 which is formed in the outer surface of the main support member 76.

As shown in FIGS. 1 through 4, the engine housing is indicated by the numeral 77 and it is provided with the three radially disposed integral supporting arms 76, 78 and 79. As shown in FIG. 4, the outer ends of the two supporting arms 78 and 79 are fixedly connected to the inner surface of the entrance air guide duct 67 by means of a plurality of suitable lock bolts as 80. The front end view of the engine as shown in FIG. 2 illustrates that the engine housing is made in two substantially half-round cylindrical portions with the main supporting arm 76 being integrally connected to one half of the housing and the other two supporting arms 78 and 79 integrally connected to the other half of the engine housing. The front end of the engine housing is enclosed and provided with a streamlined shape by means of a bullet shaped cover 81 which is provided with an opening 82 at the front end thereof to permit air to be scooped into the engine housing for cooling purposes as more fully explained hereinafter. The cover 81 may be secured to the front end of housing by any suitable means, as by the lock screws 83. It will be seen that the cover 81 functions as a wind deflector and air scoop.

As shown in FIG. 4, the reaction engine of the present invention includes an engine block assembly which comprises a front portion generally indicated by the numeral 84 and a rear portion generally indicated by the numeral 85. The engine block assembly is fixedly secured in the engine housing 77 by means of the rear plenum chamber member generally indicated by the numeral 86 and the front plenum chamber member generally indicated by the numeral 87. The engine block front portion 84 is provided with six piston cylinders which are opened at the rear end thereof and which are aligned with six mating piston cylinders in the rear engine portion 85. The piston cylinders in the rear engine block portion 85 are open at the front end thereof. It will be seen that the engine block portions 84 and 85 are provided with integral head portions and a separate head block for enclosing the cylinders is not required. As shown in FIG. 4, the two engine block portions are fixedly connected by a plurality of lock bolts 88 which are adapted to threadably join and lock together a pair of mating flanges formed on the adjacent ends of the two engine block portions 84 and 85. As shown in FIGS. 4, 7 and 8, the engine block is provided with a plurality of peripherally disposed, longitudinally spaced apart, integral cooling fins 89.

As shown in FIG. 8, the cylinders formed in the engine block are indicated by the numerals 90, 91, 92, 93, 94 and 95. Slidably mounted in each of the last mentioned respective piston cylinders, is one of the double acting pistons 96, 97, 98, 99, 100 and 101. As shown in FIGS. 4 and 8, each of the last mentioned respective pistons is provided with a pin follower as 102, 103, 104, 105, 106 and 107. The last mentioned pin followers are adapted to ride in a spiral groove 108 which is formed in the enlarged cylindrical portion 109 of the engine driveshaft. The engine power driveshaft is further provided with the integral forwardly extended reduced portion 110 and the rearwardly extended reduced portion 111. The spiral groove 108 is a precision machined perfect gyration so as to allow each piston to make a stroke backwardly and forwardly equal to the distance of the circumference of the gyrated diameter that the lead angle of the spiral groove is based upon. As shown in FIG. 4, the driveshaft or crankshaft is suitably rotatably journalled in a pair of "Teflon" bearing constructions generally indicated by the numerals 112 and 113. As shown in FIGS. 4 and 12, the front end of the driveshaft portion 110 is reduced as indicated by the numeral 114. Fixedly secured on the reduced shaft front end 114 by any suitable means, is a toothed fly-wheel 115. As shown in FIG. 4, the fly-wheel 115 rotates in the fly-wheel housing 116 and operatively mounted in the front wall of the fly-wheel housing is a suitable support bearing 117 for the front end of the driveshaft reduced portion 114.

As shown in FIG. 4, the fly-wheel housing 116 is operatively mounted in the recess 118 formed in the front face of the plenum chamber 87. As shown in FIG. 6, the front plenum chamber 87 is a cylindrical plate member having a flange 119 which is adapted to be disposed on the inwardly extended front flange 120 of the engine housing 77 and to be fixedly secured thereto by a plurality of peripherally located lock screws indicated by the numerals 121. Formed on the inner face of the front plenum chamber 87 are a plurality of circular spaced recesses as 122 which are adapted to receive and have seated therein the cylindrical longitudinally extended cylinder heads 123, 124, 125, 126, 127 and 128. The last mentioned cylinder heads are formed on the forward end of the engine block front portion 84. The rear engine block portion 85 is provided with similar cylinder heads which are adapted to be seated in similar recesses as 122a formed in the forward side of the rear plenum chamber member 86. As shown in FIG. 4, the rear plenum chamber member 86 is provided with a peripheral flange 129 which is adapted to be seated against the inwardly extended integral flange 130 formed in the rear end of the engine housing 77. It will be understood that the engine would be mounted so as to install the engine from the front end of the housing whereby the engine will be secured in the housing 77 by means of the lock bolts 121.

The compressed air is adapted to be conveyed into the aforementioned piston cylinders by means of the following described structure. The compressed air passes from the directional flow channel 75 into the adaptor fitting 131 which is connected to the rear air-feed line or conduit 132 and to the front feed air line or conduit 133. The actual connections between the adaptor 131 and the conduits 132 and 133 have been deleted for purposes of clarity.

The air conduit 133 is connected by means of the fitting 134 into the outer end of the passage 135 formed through the front plenum chamber member 87. As shown in FIGS. 4 and 6, the passage 135 communicates with the circular air distribution groove 136 which is formed on the inner face of the plenum chamber member 87. As shown in FIGS. 7 and 9, the outer end of each of the cylinder heads is provided with a recess or a chamber 137 which is called an inducer chamber, and each of these inducer chambers for each of the engine cylinders communicates with the distribution groove 136. The compressed air thus passes the distribution groove 136 into the various inducer chambers 137. As shown in FIGS. 7 and 9, the inducer chamber 137 for each of the piston cylinder heads is connected by means of three longitudinally extended ball-valve chambers 138. Operatively mounted in each of the ball chambers 138 is a ball valve 139 which is normally seated, as shown in FIG. 9, in a valve seat in the inner end of the chambers 138 so as to block any communication therethrough to the piston cylinders. As shown in FIG. 9, the inner ends of the ball valve chambers 138 are connected to the cylinders by means of reduced size passageways 140. The ball valves 139 are normally held against their respective seats by means of a suitable return coil spring as 141.

As shown in FIGS. 4 and 8, each end of the pistons is provided with three ball pusher probes 142. It will be seen that the ball check valves stop the compressed air from entering the piston cylinders until the pistons move to either their front or rear end positions, whereby the ball probes 142 will enter the passages 140 and unseat the ball valves 139 whereby compressed air will be admitted into the piston cylinder to force the piston to the opposite end of the cylinder. While the ball check structure and the means for unseating the same has been described for the front end of the engine, it will be understood that the rear end of the engine is provided with similar structure as shown in FIG. 4. The air conduit 132 feeds air into the distribution groove on the inside of the rear plenum chamber member 86 in the same manner as the aforedescribed distribution groove 136 formed in the front plenum chamber member 87. When the pistons have been moved by the compressed air to the opposite end of their respective cylinders, the spent air escapes through the exhaust parts 143 which are stationed at the end of the inward stroke of each piston end so as to permit the cycle to be repeated.

The air motor or reaction engine 19 is adapted to be started in the correct direction of rotation by means of an air starter generally indicated by the numeral 144 in FIGS. 4 and 12. The air starter 144 automatically starts rotating when compressed air enters the starter from the air line or conduit 145. The conduit 145 would be connected to the conduit 133. The starter 144 is adapted to automatically stop when the reaction engine is started. The air starter 144 comprises a main housing 146 and a shaft housing 147. The main housing 146 is adapted to be fixedly connected to the front end of the flywheel housing 116 by any suitable means, as by suitable lock bolts.

The air starter is provided with a rotor barrel chamber 148 in which is rotatably mounted the power rotor barrel 149 which is provided with a plurality of peripheral rotor blades 150. The rotor barrel 149 is supplied with compressed air for engagement with the rotor blades 150 to revolve the same in its chamber 148 by means of compressed air which is admitted to the rotor barrel chamber 148 through the inlet port 151. Threadably mounted in the outer end of the port 151 is the fitting 152 which is connected to the air conduit or flexible tube 153. The other end of the flexible tube 153 is connected by means of the fitting 154 to the outer end of the port 155. The inner end of the port 155 is provided with a valve seat 156. The port 155 is formed in the front end of the manifold 157 which encloses the plunger chamber 158. As shown in FIG. 12, the port 155 communicates with the bore 159 in which is slidably mounted the plunger stem 160. The plunger stem bore 159 communicates with the air inlet passageway 161. Threadably mounted in the outer end of the inlet pasage 161 is the fitting 162 to which is connected the compressed air supply line 145.

The plunger stem 160 is provided with a pair of suitable O-ring sealing means 163, and the stem is connected at the rear end thereof to the plunger valve 164 which is slidably mounted in the chamber 158 formed in the front end of the air starter housing 146. The plunger valve 164 is provided with the large O ring sealing means 164a. As shown in FIG. 12, the return spring 165 normally maintains the plunger valve 164 in the position shown in FIG. 12 whereby the plunger valve 164 abuts the inner end of the chamber 158. The air inlet passage 161 is connected to the by-pass air passage 166. The inner end of the by-pass channel 166 is connected by means of the air metering orifice 167 to the needle valve bore 168 which in turn communicates with the inner end of the plunger valve chamber 158. Slidably mounted in the bore 168 is a needle valve 169 which is integrally connected to the inner end of the power rotor shaft 170.

As shown in FIG. 12, the rear end of the shaft 170 is suitably journalled in the recess 171 formed in the housing dividing wall 172. The recess 171 communicates with the needle valve bore 168. The air starter power shaft 170 is slidably mounted through the center of the power rotor barrel 149 and the rear end of this shaft extends outwardly beyond the housing 146 and is provided with an integral power rotor shaft drive gear indicated by the numeral 173. The outer end of the shaft 170 is suitably rotatably journalled in the "Teflon" shaft bearing 174 which is rotatably supported by the member 147. The supporting wall 147 has integrally formed on the inner end thereof the cylindrical or tubular wall 175 which extends inwardly of the housing 146 and abuts against the outer side of the shroud bearing plate 176 which encloses the rear end of the power rotor chamber 148. As shown in FIG. 12, the power rotor 149 has a rearwardly extended hub 177 to which is attached one end of a throw-out spring 178. The other end of the throw-out spring 178 is fixedly connected to a flange on the inner end of the bearing 174.

The operation of the air starter 144 begins when compressed air enters into and against the power rotor blades 150 from the inlet port 151. The compressed air is fed to the inlet port 151 through the conduit 145, the passage 161, the bore 159, the port 155 and the conduit 153. The power rotor barrel 149 rotates instantly and throws the return spring 178 axially toward the flywheel 115 and pushing before it the power rotor shaft 170 which carries the gear 173. The gear 173 is thus engaged or meshed with the flywheel teeth for driving the flywheel 115. Air is exhausted from the power barrel chamber 148 through a plurality of exhaust ports 179. The power rotor barrel 149 will rotate on the power rotor shaft 170 independently for a fraction of a second during the movement of the shaft 170 and gear 173 into driving engagement with the flywheel 115. While the last-mentioned action is occuring, the air metering orifice 167 is opened because the needle valve 169 will be moved to the rear as viewed in FIG. 12, and air will be permitted to enter from the by-pass conduit 166 and engage the plunger valve 164 and push forward or to left as viewed in FIG. 12. When the plunger valve 164 is moved forward, the plunger stem 160 will be seated on the seat 156 whereby the flow of air through the tube 153 to the power rotor will be shut off and hence the air starter is automatically stopped. The air starter functions to turn the flywheel 115 a short distance before the ball valve probes 142 on the pistons will open the ball valves 139 to let the compressed air operate the engine. After the helicopter has landed and the entire air system is shut off, the return spring 165 will push the plunger valve 164 back to its original position as shown in FIG. 12, whereby the air starter will be readied for the next flight.

As shown in FIG. 4, the power from the linear action piston engine or air motor is transmitted to the axial flow compressor, generally indicated by the numeral 180, by coupling the reaction engine drive shaft rear portion 111 to the transmission 181 by means of a conventional gradual contact friction clutch 182. The transmission 181 is of a step-up design with a one to five ratio to enable the reaction engine to run at its rated horsepower r.p.m. The output shaft of the transmission 181, as shown in FIG. 4, is connected to the compressor shaft by means of a suitable dog clutch 183. The compressor shaft is indicated by the numeral 184 in FIG. 4. The dog clutch 183 is necessary to permit the axial flow air compressor 180 to continue rotating at speeds of 40,000 revolutions per minute or more without damage to the transmission 181.

As shown in FIG. 13, the transmission 181 includes the input shaft 185 which is coupled to the sun gear 186 to the friction clutch 182. The first sun gear 186 meshes with and transfers the power to a plurality of fixed planet gears 187 at an even ratio. The planet gears are fixed on the stub shafts 188 which are suitably rotatably journalled in the front wall 189 of the front half of the tranmission housing 190. The transmission housing further includes a rear half 191. A centrally disposed dividing wall 192 is disposed between the front and rear portions of the transmission housings 190 and 191. As shown in FIG. 13, the housing portions are provided with abutting flanges which are fixedly secured together by any suitable means as by the lock bolts 193.

The planet gears 187 mesh with the first reduction ring gear 194 whereby the r.p.m. is reduced by 33⅓ percent, as compared to the r.p.m. of the planet gears 87. The pitch diameter of the integrally connected ring gear 195 is increased as compared to the ring gear 194 in order to step up the r.p.m. of a plurality of planet gears 196. As shown in FIG. 13, the integrally connected ring gears 194 and 195 are fixedly connected to the carrier plate 197 by means of a plurality of lock bolts 198. The carrier plate 197 is provided with the supporting journals 199 and 200. The journal 199 is rotatably mounted in a suitable bearing recess in the inner end of the input shaft 185. The other supporting journal 200 is journalled in a suitable recess in the forward end of a supporting shaft carried on the front side of a rotatable plate 201 which has integrally formed thereon the ring gear 202. The planet gears 196 are carried on the stub shafts 203 which are suitably rotatably journalled in the intermediate transmission wall 192. The r.p.m. is stepped up to two times that of the gears 196 by means of the next in line sun gear 204. The sun gear 204 is integral with the shaft 205 which is journalled in the intermediate wall 192 and which carries the plate 201. The power is then passed by means of the ring gear 202 to the planet gears 206 which are rotatably supported by the stud shaft 207 which are mounted in the rear transmission housing wall 208. The pitch diameter of the ring gear 202 is increased over the pitch diameter of the sun gear 204 in order to further step up the r.p.m. of the planet gears 206 to two and one-half times that of the ring gear 202. The pitch diameter of the third and last sun gear 209 which is coupled to the dog clutch 183 by means of the output shaft 210 is increased. The r.p.m. of the output shaft 210 is thus stepped up to eight times that of the action engine output shaft 111. The output shaft 210 is suitably rotatably journalled in the transmission housing rear wall 208. The sun gear 209 is further provided with a forwardly extended supporting hub shaft 211 which is suitably rotatably journalled in the ring gear plate 201.

A novel feature of the transmission 181 is that all of the gear teeth and the gear shaft bearings are "Teflon" coated. This feature eliminates the need for a lubrication system in the transmission inasmuch as "Teflon" is almost frictionless. A further feature of the transmission of the present invention is that the outer periphery of the ring gear 202 is provided with a plurality of vanes 212 which are spaced radially in order to set air in motion in, through and around the complete planetary gear train of the transmission to insure proper cooling for a safety factor in the functioning of the transmission. In order to keep the size of the transmission to a minimum and with the use of a minimum number of gears, the ring gears 195, 194 and 202 are integrated with the sun gears in such a manner as to serve as a bearing for each other so as to eliminate the need for independent bearing support and to produce a compact and simple transmission construction. The hub or wheel portion 197 which carries the ring gears 194 and 195 contain a plurality of venturi type vanes 213 which are spaced radially to each other and at an angle calculated in relation to the r.p.m. within a range of 1,000 to 4,000 r.p.m. to start the air circulating from the forward section of the transmission into the rear section. As shown in FIG. 13, the rear section 191 of the transmission housing also contains passages 214 for air circulation. The intermediate wall 192 is provided with the passages 215 therethrough for cooling purposes and air flow purposes so as to set air in motion in the transmission housing.

The remaining section of the clean-air reaction engine is the axial flow of air compression section 180 which is shown in FIGS. 4, 5, 10 and 11. The rotor compressor 180 comprises at least five but not more than eight compressor rotor wheels 216 having compressor rotor blades 217 which are spaced radially on the periphery of each compressor rotor wheel and which hereafter may be referred to as a stage. Each rotor stage is mounted on a splined rotor shaft 218 and the rear end of this shaft is suitably rotatably journalled in a combination bearing 219 consisting of the needle rollers 220 and a "Teflon" inner bushing 221 and a "Teflon" outer bushing 222. The bearing 219 is mounted in a diffuser housing 223 which is the piloting member for the compressor and nozzle function 235. The front end of the shaft 218 is indicated by the numeral 184 and is connected to the dog clutch 183. The front end of the shaft 184 is suitably rotatably journalled in a bearing member similar to the bearing 219 and this bearing is suitably housed in the vertical wall 224 formed on the rear end of the engine supporting arms 76, 78, 79.

As shown in FIG. 5, the area between each stage and just in front of the first stage is provided for the stator blades 225 which are held in place by the one-piece assembly ring 226. The assembly ring 226 may also be referred to as the stator blade stage. A one-piece spacer ring 227 is disposed between each compressor rotor stage and fits tightly on the mating lip 228 of the adjacent compressor rotor wheels to provide the necessary shroud effect. A one-piece spacer ring 229 is disposed between each compressor stage and also provides the necessary shroud effect. A novel feature of the compressor is that it eliminates any type of fastener. Each rotor stage assembly is assembled only after a stator stage is assembled first in the compressor nozzle housing 230. Accordingly, once the compressor is assembled to the forward portion of the engine the rotor shaft and rotor stages and stator stages are automatically held in place. The stator blade casing and thrust nozzle member 230 is fixedly secured to the rear end of the entrance air guide duct by means of a plurality of lock bolts 231. A compressor diffuser housing 223 is fixedly secured to the casing 230 by a plurality of lock bolts 232. The entrance air guide duct and stator blade casing and thrust nozzle are enclosed by means of a wind deflector cowling 234 which is attached thereto by means of a plurality of screws as 233. The cowling is indicated by the numeral 234. The nozzle area of the compressor is indicated by the numeral 235 and the thrust reaction area is indicated by the mark of an arrow cluster designated by the numeral 236.

It will be understood that the reaction engine 20 is built in the same manner as the aforedescribed structure of the reaction motor 19. As shown in FIG. 1, the reaction motor 20 would be disposed so as to face in a direction opposite to that of the engine 19. It will be seen that the reaction engine of the present invention provides a propulsion means for an aircraft, as for example a helicopter, which is compact and simple in construction and efficient in operation. The thrust developed by the reaction engine mounted on the tip of the rotor blades provides a most efficient propulsion means for a helicopter.

The plastic material sold under the trademark "Teflon" is defined in the "Materials Handbook," (an Encyclopedia for Purchasing Agents, Engineers, Executives and Foremen, by George S. Brady, Eighth edition, McGraw-Hill Book Co., Inc., 1956), as polymerized tetrafluoro ethylene, $(CF_2CF_{2n})$.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. In an air-driven reaction engine including an air driven motor, the combination comprising:
   (a) a housing having openings at the front and rear ends thereof,
   (b) an engine block assembly in said housing,
   (c) a power shaft rotatably mounted in said engine block assembly,
   (d) a plurality of radially spaced apart piston cylinders formed in said engine block,
   (e) a plenum chamber mounted on opposite ends of said engine block assembly and enclosing the ends of said cylinders,
   (f) a double acting piston operatively mounted in each of said piston cylinders,
   (g) said power shaft having a spiral groove formed thereon,
   (h) each of said pistons having a follower pin adapted to ride in said spiral groove for driving engagement with said power shaft,
   (i) a compressed air system,
   (j) conduit means connecting said plenum chambers with said compressed air system;
   (k) an air passage means connecting the plenum chambers with the adjacent ends of said piston cylinders for supplying air thereto to move said pistons back and forth in said cylinders,
   (l) valve means operatively mounted in said air passage means, and,
   (m) means on each end of each piston for unseating the respective valve means in said air passage means when a piston approaches the same for admitting compressed air to the respective cylinder.

2. The structure as defined in claim 1, including an air driven starter operatively connected to said power shaft for starting said motor.

3. The structure as defined in claim 1, including an air compressor operatively connected to said power shaft for compressing air flowing into the open front end of said housing and to expel the compressed air out of the open rear end of the housing to provide a thrust reaction.

4. The structure as defined in claim 3, wherein: said air compressor is operatively connected to said power shaft by means of a step-up ratio transmission.

5. The structure as defined in claim 4, wherein: said transmission is connected to said power shaft and air compressor by a pair of clutch means.

6. The structure as defined in claim 4, wherein: said transmission is provided with non-lubricative bearing means for supporting the gears in the transmission.

7. The structure as defined in claim 4, wherein: said air compressor includes a rotating shaft which is supported by means of a plurality of non-lubricated bearing means.

8. In an air-driven reaction engine including an air-driven motor having a power shaft with a toothed flywheel, an air started mechanism comprising: a housing; a drive shaft rotatably and axially movably mounted in said housing; a gear on said drive shaft and adapted to be meshed with said toothed flywheel when said driveshaft is moved axially; an air-driven rotor mounted in said housing and being drivably connected to said drive shaft; a compressed air system for supplying compressed air to said rotor for driving the same; a shut-off valve means operatively mounted in said compressed air system and being normally disposed in an open position to allow air to flow to said rotor; a control valve means operated by said drive shaft, when it is moved axially to move the gear thereon into driving engagement with said flywheel, to direct compressed air against said shut-off valve means to move the shut-off valve means into a closed position to cut-off the flow of compressed air to said rotor; means for normally biasing said drive shaft into the inoperative position when the compressed air system is not supplying compressed air to said rotor and said air-driven reaction engine is stopped, and maintaining the drive shaft in said inoperative position; said air-driven motor including a plurality of double acting pistons disposed in radially spaced apart cylinders about said power shaft in an elongated cylindrical engine block; a spiral groove formed in said power shaft; each of said pistons having a follower pin adapted to ride in said spiral groove for driving engagement with said power shaft; a plenum chamber mounted on each end of said engine block; conduit means connecting said plenum chambers with said compressed air system; an air passage means connecting the plenum chambers with each end of said piston cylinders for supplying air thereto to move said pistons back and forth in said cylinders; valve means operatively mounted in said air passage means; and, means on each end of each piston for unseating the respective valve means in said air passage means when a piston approaches the same for admitting compressed air to the respective cylinder.

9. The structure as defined in claim 8, including an air compressor comprising: a shaft connected to said air-driven motor by a clutch and transmission means; a plurality of compressor rotor wheels mounted on said last named shaft; each of said rotor wheels being provided with a plurality of radially spaced apart rotor blades; a plurality of stator blades disposed radially about and on each side of the rotor blades on each rotor wheel; and, a housing enclosing the periphery of said rotor and stator blades and being open at the front and rear ends thereof to provide axial flow through the compressor and to form a nozzle and reaction thrust area at the rear outlet end thereof.

References Cited by the Examiner

UNITED STATES PATENTS

| | | | |
|---|---|---|---|
| 338,814 | 3/86 | Wood | 91—175 |
| 2,281,203 | 4/42 | Pitcairn | 70—135.21 |
| 2,611,532 | 9/52 | Ljungstrom | 230—116 |
| 2,717,118 | 9/55 | Walter | 230—116 |
| 2,734,585 | 2/56 | Ball et al. | 170—135.4 |
| 2,931,441 | 4/60 | Root | 170—135.4 |
| 3,051,136 | 8/62 | Muehlhausen | 91—53 |

FOREIGN PATENTS 793,823   4/58   Great Britain.

JULIUS E. WEST, *Primary Examiner.*

MILTON BUCHLER, ABRAM BLUM, *Examiners.*